United States Patent Office 3,300,213
Patented Jan. 24, 1967

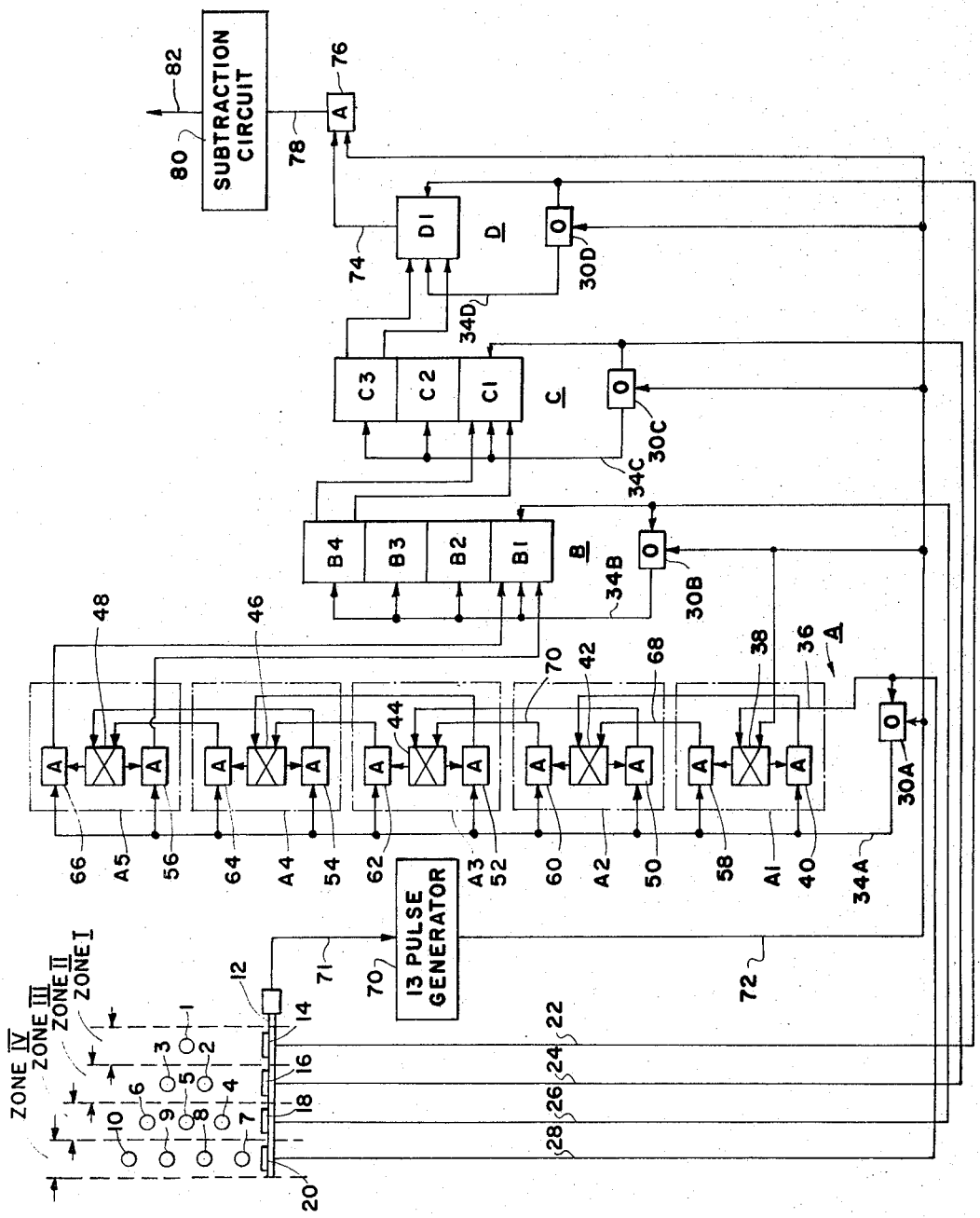

3,300,213
PINFALL DETECTING APPARATUS WITH SHIFT REGISTER STORAGE MEANS
Robert L. Miller, Olmsted Falls, Ohio, assignor to Cleveland Trust Company, Cleveland, Ohio, as trustee
Filed Nov. 21, 1963, Ser. No. 325,371
4 Claims. (Cl. 273—54)

This invention relates to apparatus for automatically detecting the number of pins knocked down after each ball is delivered in a bowling game. More particularly, the invention relates to apparatus of the type described employing solid-state circuit elements and adapted to produce electrical signals which may be used to automatically score, totalize, visually indicate and/or print the totalized score.

Although not limited thereto, the present invention is particularly adapted for use with an automatic scoring and totalizing system for a bowling game. In such systems it is first necessary, in order to score or totalize the game, to obtain an accurate indication of the pinfall after each ball in the game is rolled; and as one object the present invention seeks to provide new and improved apparatus for accomplishing this purpose.

More specifically, an object of the invention is to provide automatic pinfall detecting apparatus which employs solid-state circuit elements such as transistors in contrast to mechanical stepping switches, relays and the like. As will be seen, the system of the present invention is greatly simplified over previous systems of this type and eliminates the maintenance problems involved with mechanical switching elements.

In accordance with one embodiment of the invention, a plurality of pin detecting devices are provided, each of which is adapted to detect standing pins within a predetermined zoned area of the pin deck and to produce discrete electrical pulses equal to the number of pins which remain standing in that zoned area after each ball is delivered in a bowling game. Connected to the output of each of the pin detecting devices is an electronic shift register preferably of the type comprising a plurality of transistor flip-flop units each having two stable states of conduction and connected such that the conduction state of one flip-flop may be transferred to the next successive flop-flop by an external shift pulse. After each ball is delivered in a bowling game, pulses from the pin detecting devices are stored in the shift registers associated with the respective detecting devices. By connecting the shift registers in series and by applying an external source of shift pulses to all registers after pulses indicative of standing pins have been stored therein, a series of pulses are derived at the output of the series-connected shift registers equal to the total number of standing pins on the pin deck. These pulses are then electrically subtracted from the number of pins which are standing before the ball delivery in order to obtain a number of pulses equal to the number of fallen pins.

The above and other objects and features of the invention will become apparent from the following detailed description taken in connection with the accompanying single figure drawing which schematically illustrates one embodiment of the invention.

Referring now to the drawing, ten bowling pins are shown arranged in the usual triangular configuration and numbered 1 through 10. In the particular embodiment of the invention shown herein, standing pins in the triangular configuration are detected by means such as that shown in copending application Ser. No. 221,701, filed Sept. 6, 1962, and now abandoned. By reference to that application, it will be seen that movable across the tops of the pins 1–10 is a scanning bar 12 having a plurality of detecting elements 14, 16, 18 and 20 carried thereon. In the particular embodiment shown in Application Serial No. 221,701, the detecting elements 14–20 each comprise a hinged plate or "flapper" adapter to contact the top of a pin or pins within a predetermined zoned area of the triangular configuration of pins as the bar 12 is swept across the tops of the pins. That is, as each hinged element 14–20 contacts the top of a standing pin, it is rotated about its hinged connection to the bar 12 to close a limit switch or the like, thereby producing an electrical pulse on lead 22, 24, 26 or 28, respectively. It should be understood, however, that the particular type of detecting system shown herein is illustrative only and that any system wherein a plurality of pin detecting devices are employed may be utilized.

Let us assume, for example, that all ten pins are standing in the triangular configuration. Under these circumstances, the detecting element or hinged plate 14 will sweep across a predetermined zoned area identified as Zone I and will contact the number 1 pin, thereby producing a single pulse on lead 22. Detecting element 16 will sweep across a predetermined zoned area of the triangular configuration identified as Zone II and will contact pin numbers 2 and 3, thereby producing two pulses on lead 24. In a similar manner, elements 18 and 20 will sweep across Zone III and Zone IV, respectively, with element 18 producing three pulses on lead 26 and element 20 producing four pulses on lead 28. Of course, if certain ones of the pins in the triangular configuration are knocked down after the delivery of a ball in a bowling game, then the total number of pulses produced on all leads 22–28 will be equal to the number of pins left standing. Let us assume, for example, that all pins have been knocked down except pin numbers 4, 7 and 8. Under these circumstances, a single pulse will be produced on lead 26 and two pulses will be produced on lead 28, with no pulses at all on leads 22 and 24.

The lead 28 is connected to a shift register device A; lead 26 is connected to a shift register device B; lead 24 is connected to a shift register device C; and lead 22 is connected to a shift register device D.

With reference to the shift register device A, it will be seen that it includes a plurality of flip-flop units each having two stable states of conduction and connected such that the conduction state of one flip-flop may be transferred to the next successive flip-flop by an external shift pulse. Furthermore, the pulses appearing on lead 28 are stored in successive flip-flops in shift register A. Let us assume that four pins remain standing in Zone IV. Under these circumstances, four pulses will appear on lead 28 in succession. All pulses are applied to one input terminal of a first flip-flop 38 as well as to an OR circuit 30A. The output of the OR circuit 30A is applied through lead 34A as shift pulses to each of the flip-flops in the shift register A in a manner hereinafter described.

It will be assumed initially that the state of the flip-flop 38 is such that an "ON" or enabling signal is applied to a lower AND circuit 40 connected at its output. The same is true of all other flip-flops 42, 44, 46 and 48 in the shift register A. That is, the stable states of each flip-flop are such as to deliver an output ON signal to its lower AND circuit 50, 52, 54 or 56, respectively. At the same time, the outputs of the flip-flops 38, 42, 44, 46 and 48 applied to their upper AND circuits 58, 60, 62, 64 and 66, respectively, are "OFF" signals meaning that these AND circuits are disabled.

When the first of the four pulses on lead 28 is applied to flip-flop 38, it will change the stable states of conduction of the flip-flop 38 so that now the AND circuit 58 is enabled while AND circuit 40 is disabled. When the next of the four pulses on lead 28 reaches OR circuit 30A, the pulse on lead 34A comprising an ON signal, in combination with the ON signal from flip-flop 38, will cause the AND circuit 58 to apply an ON pulse through lead 68 to the flip-flop 42, thereby reversing its stable states of conduction and enabling AND circuit 60. The pulse on lead 36, being an ON signal, cannot switch the stable states of flip-flop 38 so that it remains in its previously-established state with AND circuit 58 enabled. Upon delivery of the third pulse, flip-flops 38 and 42 remain in their previously-established conditions. However the appearance of this third pulse on lead 34A causes AND circuit 60, which is now enabled, to apply an ON signal to flip-flop 44 to change its stable states of conduction. The fourth pulse on lead 28 changes the stable states of flip-flop 46 so that now all four flip-flops 38, 42, 44 and 46 have been reversed, meaning that there are four such pulses stored in the shift register A.

Assuming that all four pulses on lead 28 have been applied to the shift register A, it will be appreciated that each of the AND circuits 58, 60, 62, 64 and 56 will be enabled while AND circuits 40, 50, 52, 54 and 66 will be disabled. Furthermore, it will be noted that the shift register A comprises five storage units A1, A2, A3, A4 and A5, each enclosed by broken lines and one greater than the number of pulses on lead 28.

In a somewhat similar manner, the shift register B comprises four storage units B1, B2, B3 and B4, one greater than the total number (i.e., three) of pulses on lead 26. The shift register B also includes an OR circuit 30B which functions in the same manner as circuit 30A for shift register A. The shift register C includes three storages units C1, C2 and C3, again one greater than the total number of pulses on lead 24 for any detecting operation. Finally, the shift register D includes only one storage unit D1 which is equal in number to the single pulse which can appear on lead 22 during a detecting operation.

The shift registers A, B, C and D are connected in series with the output of storage unit A5 being connected to the input of storage unit B1; the output of storage unit B4 being connected to the input of storage unit C1; and the output of storage unit C3 being connected to the input of storage unit D1.

Let us assume, for example, that after a ball is delivered in a bowling game all pins except the number 1, 3, 6 and 10 pins remain standing. Under these circumstances, the storage units A1, A2 and A3 will store pulses from pin numbers 7, 8 and 9; storage units B1 and B2 will store pulses from pin numbers 4 and 5; and storage unit C1 will store a pulse from pin number 2. In order to "clear" the shift registers A, B, C and D to derive the pulses stored therein, an external source of shift pulses 70 is provided. This source of pulses is such that when the scanning member 12 completes its scan across the tops of the pins in either direction, it will be actuated through lead 71 to produce thirteen output pulses, equal in number to the total number of storage units in shift registers A, B, C and D. The output of the pulse generator 70 is applied through lead 72 to the inputs of each of the OR circuits 30A, 30B, 30C and 30D. Additionally, it is applied to the first flip-flop 38 in shift register A in a manner to enable the AND circuit 40. In this process, the pulse stored in shift register C will be transferred to shift register D, those in shift register B will be transferred to shift registers C and D, and those in shift register A will be transferred to shift registers B, C and D where they finally appear on output lead 74.

The operation of the shift registers can possibly best be understood in terms of "1's" and "0's" where a "1" indicates one stable state of a flip-flop and a "0" indicates the other stable state. Initially, register A, for example, is set to start:

00000 where each "0" indicates the state of an associated flip-flop 38, 42, 44, 46 and 48.

In the case assumed where pin numbers 7, 8 and 9 remain standing in Zone IV, after the first pin was detected, register A would contain:

10000 after the second pin was detected,

11000 and after the third pin was detected,

11100

All standing pins have now been detected in this zone, and the register A contains a number of "1's" corresponding to the number of standing pins.

This number can then be shifted out by the thirteen-pulse generator 70 as follows, with the first pulse from the generator serving to reverse the stable states of flip-flop 38 directly from lead 72 and all following pulses serving to reverse the stable states of successive flip-flops through OR circuit 30A, lead 34A and the AND circuits:

| | |
|---|---|
| 01110 | 1st shift |
| 00111 | 2nd shift |
| 00011 | 3rd shift |
| 00001 | 4th shift, 1st output |
| 00000 | 5th shift, 2nd output |

The 6th through 13th pulses have no effect on register A. They serve to shift the bits down through the other registers.

The following is an example of what the entire four registers would look like if pins 2, 4, 5, 7, 8 and 9 were left standing, with the scanning bar starting from its position shown in the drawing.

| Shift Registers | | | | |
|---|---|---|---|---|
| A | B | C | D | |
| 00000 | 0000 | 000 | 0 | Initial state. |
| 10000 | 0000 | 000 | 0 | 7 detected. |
| 10000 | 1000 | 000 | 0 | 4 detected. |
| 11000 | 1000 | 100 | 0 | 8 and 2 detected. |
| 11000 | 1100 | 100 | 0 | 5 detected. |
| 11100 | 1100 | 100 | 0 | 9 detected. |

The register now contains the number of standing pins, and is ready for the count-out cycle as follows:

| Shift Registers | | | | |
|---|---|---|---|---|
| A | B | C | D | |
| 11100 | 1100 | 100 | 0 | State before shifting. |
| 01110 | 0110 | 010 | 0 | Gen. pulse 1. |
| 00111 | 0011 | 001 | 0 | Gen. pulse 2. |
| 00011 | 1001 | 100 | 1 | Gen. pulse 3. |
| 00001 | 1100 | 110 | 0 | Gen. pulse 4, output pulse 1. |
| 00000 | 1110 | 011 | 0 | Gen. pulse 5. |
| 00000 | 0111 | 001 | 1 | Gen. pulse 6. |
| 00000 | 0011 | 100 | 1 | Gen. pulse 7, output pulse 2. |
| 00000 | 0001 | 110 | 0 | Gen. pulse 8, output pulse 3. |
| 00000 | 0000 | 111 | 0 | Gen. pulse 9. |
| 00000 | 0000 | 011 | 1 | Gen. pulse 10. |
| 00000 | 0000 | 001 | 1 | Gen. pulse 11, output pulse 4. |
| 00000 | 0000 | 000 | 1 | Gen. pulse 12, output pulse 5. |
| 00000 | 0000 | 000 | 0 | Gen. pulse 13, output pulse 6. |

In the particular case assumed, six pulses will, therefore, appear on lead 74. These pulses are applied along with the pulses from pulse generator 70 on lead 72 to an AND circuit 76 such that the AND circuit will produce a pulse on lead 78 each time pulses on leads 74 and 72 coincide. For the particular case assumed, this will occur six times during the thirteen-pulse cycle of generator 70, thereby producing six pulses on lead 78 which are applied to subtraction circuit 80 which subtracts the six pulses from the number of previously standing pins in order to derive on lead 82 a number of pulses equal to the number of fallen pins, in this case three. The subtraction circuit 80 may be of any suitable type.

It will be noted that in all of the shift registers except the last, the number of flip-flop units is one greater than the maximum number of pulses to be stored therein. This is done in the event that a pin in one of the first three zones slides back into the next zone and is detected there along with the normal maximum number of pins in that zone.

The present invention, therefore, provides a means for converting standing pin count into fallen pin count with the use of solid-state circuit elements and independently of any mechanically moving parts or the like. Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that the transistor flip-flop shift registers as shown herein may be replaced by shift registers of the magnetic-core type if desired, the overall result being the same.

I claim as my invention:

1. In apparatus for producing a number of electrical pulses equal to the number of standing pins on a bowling alley pin deck, the combination of a plurality of pin detecting devices each adapted to detect pins within a predetermined zoned area of the pin deck and to produce a number of discrete electrical pulses equal to the number of standing pins in its associated zoned area, a plurality of shift register devices each of which is coupled to an associated one of said pin detecting devices, means for coupling said shift register devices in series, and means including an external source of shift pulses for deriving output pulses equal in number to the number of standing pins from the last of said series-connected shift register devices.

2. In apparatus for producing a number of electrical pulses equal to the number of pins knocked down on a bowling alley pin deck, the combination of a plurality of pin detecting devices each adapted to detect pins within a predetermined zoned area of the pin deck and to produce a number of discrete electrical pulses equal to the number of standing pins in its associated zoned area, a plurality of shift register devices each of which is coupled to an associated one of said pin detecting devices, means for coupling said shift register devices in series, each of said shift register devices comprising a plurality of flip-flop units having two stable states of conduction and connected such that the conduction state of one flip-flop unit may be transferred to the next successive flip-flop unit by an external shift pulse, means for applying external shift pulses to said flip-flop units after pulses have been stored therein to derive at the output of the series-connected shift register devices a number of pulses equal in number to the number of standing pins, and circuit means connected to the output of the series-connected shift register devices for subtracting said pulses equal in number to the number of standing pins from ten to thereby derive a number of pulses equal to the number of fallen pins.

3. In apparatus for producing a number of electrical pulses equal to the number of pins knocked down on a bowling alley pin deck, the combination of a plurality of pin detecting devices each adapted to detect pins within a predetermined zoned area of the pin deck and to produce a number of discrete electrical pulses equal to the number of standing pins in its associated zoned area, a plurality of shift register devices each of which is coupled to an associated one of said pin detecting devices, means for connecting said shift register devices in series, each of said shift register devices comprising a plurality of flip-flop units having two stable states of conduction and connected such that the conduction state of one flip-flop unit may be transferred to the next successive flip-flop unit by an external shift pulse, the number of flip-flop units in each of the series-connected shift register devices except the last being one greater than the maximum number of pins to be detected within its associated zoned area, means for applying external shift pulses to said flip-flop units to thereby derive at the output of the series-connected shift register devices output pulses equal in number to the number of standing pins, and circuit means connected to the output of the series-connected shift register devices for subtracting said pulses equal in number to the number of standing pins from ten to thereby derive a number of pulses equal to the number of fallen pins.

4. In apparatus for producing a number of electrical pulses equal to the number of pins knocked down in their normal triangular configuration on a bowling alley pin deck, the combination of four pin detecting devices each adapted to detect pins within a predetermined zoned area of the pin deck and to produce a number of discrete electrical pulses equal to the number of standing pins in its associated zoned area, the first of said detecting devices being adapted to detect a maximum of four pins in the triangular configuration, the second of said detecting devices being adapted to detect a maximum of three pins in the triangular configuration, the third of said pin detecting devices being adapted to detect a maximum of two pins in its associated zoned area, and the fourth of said pin detecting devices being adapted to detect only a single pin within its zoned area, a plurality of shift register devices each of which is coupled to an associated one of said pin detecting devices, the shift register device connected to said first detecting device comprising five flip-flop units having two stable states of conduction and connected such that the conduction state of one flip-flop unit may be transferred to the next successive flip-flop unit by an external shift pulse, the shift register device connected to said second detecting device comprising four flip-flop units connected in the manner described above, the shift register device connected to said third detecting device having three flip-flop units therein connected in the manner described above, the shift register device connected to said fourth detecting device having a single flip-flop unit therein, means for coupling said shift register devices in series, a source of external shift pulses adapted to produce a train of thirteen pulses, means for applying said external source of shift pulses to said shift register devices to thereby cause a number of pulses to appear at the output of said series-connected shift register devices equal to the number of standing pins, and circuit means connected to the output of the series-connected shift register devices for subtracting said pulses equal in number to the number of standing pins from ten to thereby derive a number of pulses equal to the number of fallen pins.

References Cited by the Examiner
UNITED STATES PATENTS
3,124,355 3/1964 Mentzer et al.
3,202,803 8/1965 Markstrom _____ 273—43 X

OTHER REFERENCES
High-Speed Computing Devices, McGraw-Hill, New York, 1950, pp. 35, 36, 45–49, 297 and 299.

DELBERT B. LOWE, *Primary Examiner.*

ANTON O. OECHSLE, *Examiner.*